Oct. 18, 1927.  
J. G. SUTHERLAND  
1,645,830

COMBINATION TIRE CARRIER AND SIGNALING MEANS

Filed Oct. 10, 1923

INVENTOR  
John G. Sutherland,  
BY  
Howard S. Smith,  
ATTORNEY

Patented Oct. 18, 1927.

1,645,830

UNITED STATES PATENT OFFICE.

JOHN G. SUTHERLAND, OF OAKWOOD, OHIO.

COMBINATION TIRE CARRIER AND SIGNALING MEANS.

Application filed October 10, 1923. Serial No. 667,775.

This invention relates to new and useful improvements in combination tire carriers and signaling means, and has particular reference to a signal-light carrying panel which may be hingedly secured to any standard tire carrier.

It is one of the principal objects of my invention to provide for a tire carrier, a panel which may be hingedly secured thereto to support the signal lamps, tail light and license plate. My device, which may be easily attached to the carrier, not only lends an ornamental dignity to it, but displays the license plate, tail light and signal lamps in a unique, distinctive and attractive manner.

It is another object of my invention to provide means for locking the tire on the carrier, that shall be the same as those employed for holding the panel in its closed position after the tire has been slipped over it. The panel may be easily opened, when unlocked, to insert new electric lamps in the cages on its rear side, and closed to permit the rays of those lamps to shine through the holes that form the signal words in its face.

Figure 1:
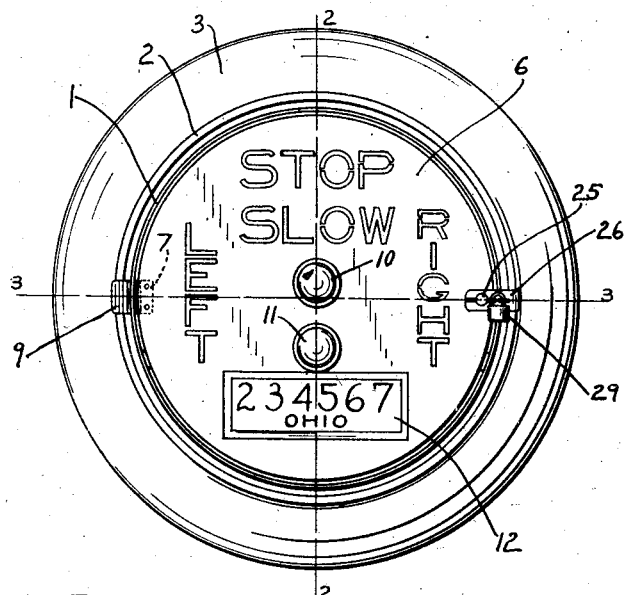
Figure 2:
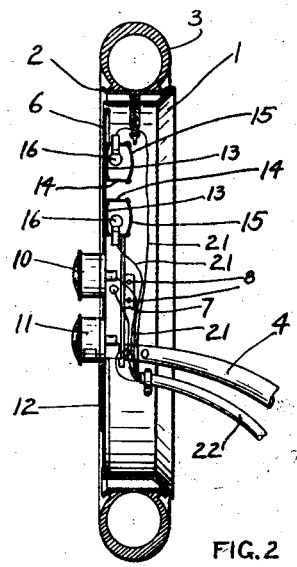
Figure 3:
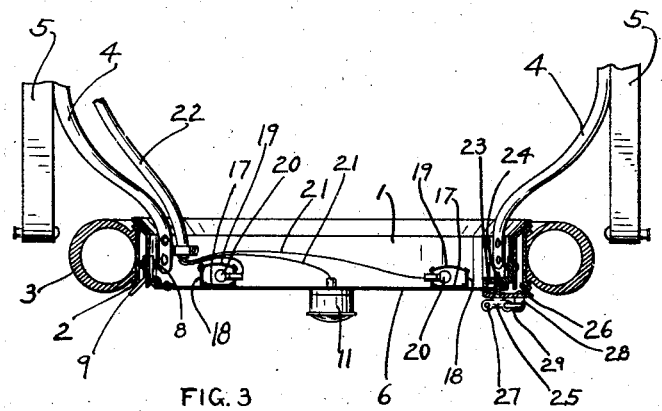
Figure 4:
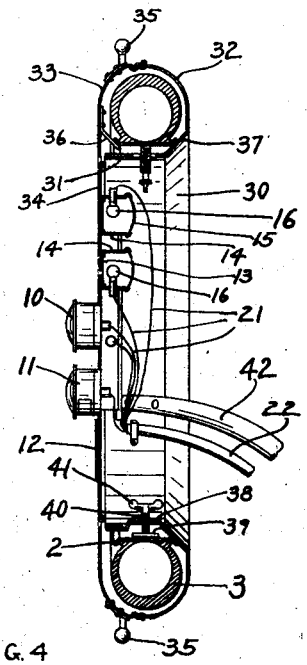

In the accompanying drawings, Figure 1 is a rear elevational view of a tire carrier within which the signal-lamp carrying panel is hingedly secured. Figure 2 is a vertical, sectional view taken through the same on the line 2—2 of Figure 1. Figure 3 is a horizontal, sectional view taken through the tire carrier and panel on the line 3—3 of Figure 1. And Figure 4 is a vertical, sectional view of a specially constructed tire carrier and signal-lamp supporting panel.

Throughout the specification and drawings, similar reference characters denote corresponding parts.

Referring to the accompanying drawings for a detailed description of my invention, the numeral 1 designates a circular metallic frame of an ordinary type to receive and support the demountable rim 2 of a pneumatic tire 3. By means of bracket arms 4 the frame 1 is secured to the rear springs 5, 5 of an automobile (not shown). The tire carrier frame which I have described, and have also illustrated in Figures 1, 2 and 3, is merely one type of a number of tire carriers to which my sign-displaying holder now to be described, may be secured.

Preferably formed in disc-shape from suitable material by dies or other means, is a panel 6 which is adapted to easily fit within the carrier frame 1. In order that it may swing outwardly therefrom, this panel is pivotally secured to one side of the frame by a plate hinge 7. The latter may be easily secured to the interior portion of one side of the circular frame 1 by the bolts 8 which secure to its outer periphery an angle plate 9 that engages the tire rim 2, or it may be secured to said frame in any other way. (See Figures 2 and 3.)

The panel 6 has two central holes through the upper one of which there projects a backing lamp 10, and through the lower one, a tail lamp 11. Below the latter a license plate 12 is attached to the panel. (See Figure 1.)

Formed in the panel above the backing lamp 10 is a horizontal row of letters spelling the word Slow, and just above the latter is another horizontal row of letters spelling the word Stop. At the left of the lamp 10, the panel 6 contains a vertical row of letters holes spelling the word Left, and at the right of said lamp there is a vertical row of letter holes in the panel spelling the word Right. (See Figure 1.)

Behind each horizontal row of letter holes spelling the words Slow and Stop, is a colored glass 13 in the front portion of an electric-lamp containing housing or cage 14. Each housing is open at its rear end for closure by a slide 15, which may be easily moved to afford access to the interior of the same for the insertion of removal of an electric lamp bulb 16. (See Figure 2.) Behind each vertical row of letter holes spelling the words Right and Left, there is placed a colored glass 17 in the front portion of a housing or cage 18 having a rear open end that is closed by a slide 19. The latter may be easily shifted to afford access to the interior of the cage for the replacement of the electric bulb 20 therein. Wires 21 lead to the various electric lamps on the panel from a flexible conduit 22 secured to the carrier frame 1 and connected with a source of electric current not shown. (See Figures 2 and 3.)

It will thus be seen that I have provided a panel which not only serves to display the Stop, Slow, Right and Left signals, but to support the signal, tail and backing lamps and the license plate in a distinctive and symmetrical manner. To mount all of these means on one unit within the tire carrier frame, conserves space and adds to the appearance of the rear end of the car. Being hinged to the carrier frame, the panel may be easily opened to afford access to the signal and other lamps, and it may be held securely in its closed position by means now to be described.

Secured to the interior portion of the carrier frame 1 opposite the hinge 7, is an angle plate 23 having a forwardly turned outer edge for engagement by the panel. The radial portion of this angle plate contains a threaded hole which is adapted to receive a screw 24 terminating at its outer end in a handle 25. The numeral 26 designates a locking clamp containing a hole near its rear end through which the screw 24 is adapted to pass. This clamping piece 26 has a beveled outer end which is adapted to engage the demountable rim 2 to hold it firmly on the carrier frame 1 when the screw 24 is turned into the angle plate 23. (See Figure 3.) Before entering the angle plate, the screw 24 passes through a hole in the panel 6, so that the latter may be firmly held in a closed position by the inner end of the clamp when its outer end is pressed against the tire rim by the screw.

In order that the clamping piece may be locked against the panel and the tire rim, there is provided in each end of the handle portion of the screw 24, a hole 27. Through either one of these handle holes and a hole in an ear 28 on the clamp 26, the link of a padlock 29 may be passed to securely lock the tire on the carrier frame and the panel in its closed position. (See Figures 1, 2 and 3.) By removing the padlock, the clamping piece 26 may be turned on the screw 24 to withdraw its outer end from the path of outward movement of the tire rim 2, whereupon the latter may be taken off the carrier frame over the panel 6. If it is desired to open the panel, the screw 24 is removed from the angle plate 23, whereupon the panel may be swung outwardly on its hinge to render the electric lamps, wires and other parts carried by it easily accessible. In no case will the panel interfere with the mounting of a tire on the carrier frame, or the removal of one from it.

In Figure 4 I have shown a tire carrier frame 30 that is formed of sheet steel or other suitable material to provide an annular shoulder 31 to receive the tire rim and a channel or canopy portion 32 to partly cover the tire. The outer end of the channel portion 32 of the frame 30 is externally threaded to receive the threaded inner end of an annular channel member 33 which is constructed of sheet steel or other suitable material and surrounds a panel 34 similar to the panel 6. The member 33 is screwed onto the carrier frame 30 by handles 35 which project outwardly from its exterior surface.

Secured to the inner straight surface of the channel member 33 is an angle plate 36 which is engaged by the front part of the demountable rim 2 of the tire when said channel member is screwed inwardly. Opposite the angle plate 36 the carrier frame 30 is formed with a similarly inclined portion 37 which assists the inclined part of the angle plate in supporting the tire rim 2 as illustrated in Figure 4.

For the purpose of firmly holding the tire rim on the carrier frame 30, the shoulder part 31 of the latter is formed with recesses 38 to receive rim engaging shoes 39. Each shoe 39 is secured to the inner end of a screw 40 which projects through a threaded hole in the shoulder portion 31 of the carrier frame, one screw and shoe being shown in Figure 4. At its inner end each screw 40 terminates in a handle portion 41 by means of which, when the panel 34 is opened, the screws 40 may be turned to press the shoes 39 tightly against the interior surface of the tire rim 2 to firmly hold the latter on the carrier frame.

By means of bracket arms 42, the tire carrier just described may be easily attached to the rear springs of an automobile, and the panel 34, which is similar to the panel 6, may be hingedly secured within the carrier in the same manner as the latter panel is secured within the carrier frame 1. The panel is, of course, subject to modification in the arrangement and number of the signaling devices which it carries as well as in its construction. I do not wish to be limited to other details of construction and arrangement herein shown and described, and any changes or modifications may be made therein within the scope of the subjoined claims.

Having described my invention, I claim:

1. The combination with a tire carrier frame, of a sign-displaying member hingedly secured therein, said carrier frame having recesses formed in its periphery, shoes in said recesses, and screw means accessible when the sign-displaying member is opened, to press the shoes into engagement with the inner surface of the tire rim to hold it on the carrier frame.

2. The combination with a tire carrier frame having recesses formed in its periphery, of a sign-displaying member hingedly secured within said frame, outwardly movable members in said recesses, and means extending through said frame and accessible when the sign-displaying member is opened, to press the outwardly movable members into engagement with the inner surface of the tire rim to hold it on the carrier frame.

3. The combination with a tire carrier frame, of a sign-displaying panel secured therein and over which the tire may be slipped for support by said frame, a plate hinge for securing said panel to one side of said frame, an angle plate for engaging the tire rim, and means passing through both the plate hinge and the angle plate for securing them in opposite positions to the frame.

4. The combination with a tire carrier frame, of a sign-displaying panel within said frame and over which the tire may be slipped for support by said frame, a hinge attached to one side of the frame for hingedly securing the panel therein, and a locking member securable over the panel at the opposite side of the frame and formed with an outer angular end to engage over the tire rim for the purpose specified.

In testimony whereof I have hereunto set my hand this 8th day of October, 1923.

JOHN G. SUTHERLAND.